June 24, 1958

H. W. VAN NESS 2,840,776

SEQUENCE TIMER

Filed Nov. 30, 1955

WITNESSES

INVENTOR
Hubert W. VanNess
BY
ATTORNEY

United States Patent Office

2,840,776
Patented June 24, 1958

2,840,776

SEQUENCE TIMER

Hubert W. Van Ness, Diablo, Calif., assignor to Westinghouse Electric Corporation, East Pittsburgh, Pa., a corporation of Pennsylvania Application November 30, 1955, Serial No. 550,079

8 Claims. (Cl. 323—18)

This invention relates to electric discharge apparatus, and has particular relation to sequence timers for electric resistance welding and for like industrial processes. This application is based on experience with the apparatus disclosed in an application, Serial No. 424,094, filed April 19, 1954 to Hubert W. Van Ness for Electric Discharge Apparatus, and, to the extent that subject matter common to the latter application and to this application may be claimed in this application, this application is a continuation-in-part of application 424,094.

The apparatus disclosed in application 424,094 has, on the whole, performed satisfactorily, but its use where highly precise timing is demanded has been hampered by a deficiency in the timing. It has been found in operation that the actual timing of the squeeze timing means and the hold timing means departs irregularly by a half period from the number of periods for which these means are set. For example, with the squeeze timing means or the hold timing means set for three periods, the actual interval timed by one or the other may be three and a half periods rather than three periods.

It is, accordingly, an object of this invention to provide a sequence timer of the type disclosed in application Serial No. 424,094, the squeeze and hold timing means of which shall time precisely in accordance with their settings.

The aspect of this invention, which has resulted in the elimination of the irregularities of the timing of the squeeze time or the hold time of the earlier apparatus, arises from the realization that the deficiency in the earlier apparatus is caused by the fact that the discharge device (ST Fig. 1) which actuates the relay that controls the supply of welding current, the discharge device (AT Fig. 1) which terminates the flow of welding current and the discharge device (HT Fig. 1) which terminates the hold time are all supplied from conductors (AL3—AL2) of the same phase. The irregularities in this apparatus arise from an inaccuracy in the starting and stopping of the welding current. In accordance with this invention, the discharge device which controls the flow of welding current is supplied with anode-cathode potential from a pair of conductors which are of opposite phase to the conductors which supply the discharge devices that start the timing of the weld time and that terminates the timing of the hold time. There is thus a delay of at least one-half period between the rendering conducting of the discharge device which controls the welding current and the timing out of the squeeze timing means, and the conduction of the discharge device which controls the welding current is terminated later by this same half period than in the apparatus of application 424,094. The introduction of this delay eliminates the irregularity in the timing of the squeeze and hold times.

Another aspect of this invention arises from experience with applications Serial Nos. 490,871 and 490,872, both filed February 28, 1955 to Hubert W. Van Ness and William E. Large, the former for Electric Discharge Apparatus and the latter for High Speed Welding Control. Both applications are incorporated hereby by references and to the extent that an invention of Hubert W. Van Ness, alone, may be disclosed in one of these applications. This application is a continuation-in-part of applications 490,871 and 490,872.

In the apparatus disclosed in applications 490,871 and 490,872, the weld timing means includes a pair of discharge devices (WT1 and WT2, Fig. 1A, 490,871, Fig. 4B, 490,872), both of which are rendered conducting at the end of the weld interval if the apparatus is operating properly. If the apparatus is not operating properly and only one of the discharge devices is rendered conducting, the flow of welding current is terminated, but the timing out of the hold timing means does not start so that further sequencing of the timer is prevented. On the whole, the apparatus disclosed in applications 490,871 and 490,872 has operated satisfactorily, but a deficiency has been noted, in that at times there is an irregularity in the timing of the hold network in spite of the fact that both of the discharge devices of the weld timing means are sound.

It is, accordingly, an object of this invention to eliminate irregularities in timing of a sequence timer, such as is typified by applications 490,871 and 490,872, in which the weld timing means includes two discharge devices, both of which are rendered conducting if the apparatus is not defective.

Stated another way, it is an object of this invention to provide such a sequence timer capable of highly precise timing.

This aspect of applicant's invention arises from the discovery that the irregularities in the timing are caused by the failure of the two discharge devices of the weld timing means to become conducting together. In accordance with this invention, the deficiency is eliminated by providing an interconnection between the two discharge devices which assures that once one of the devices is rendered conducting, the other device, if it is sound promptly also becomes conducting.

Experience with electric resistance welding apparatus has uncovered the need for an emergency switch or push button by operation of which the sequence timer can be immediately deenergized. Such a switch should be simple in structure and in its connection in the circuit and should positively assure that all discharge devices of the sequence timer will be rendered non-conducting.

It is, accordingly, an object of this invention to provide an emergency switch or push button for positively terminating the conduction of all discharge devices of a sequence timer on the occurrences of an emergency or under any other circumstances for which the switch or button may be actuated.

In accordance with this aspect of the invention, a switch is provided between the cathodes of the discharge devices and the intermediate power supply terminal of a sequence timer of the type shown in the above-identified applications. When this switch is opened, it disconnects all of the cathodes from the supply, and thus renders all of the discharge devices non-conducting.

The novel features considered characteristic of this invention are disclosed generally above. The invention itself, both to its organization and to its method of operation, together with additional objects and advantages thereof, will be understood from the following description of specific embodiments when read in connection with the accompanying drawings, in which.

Figure 1:
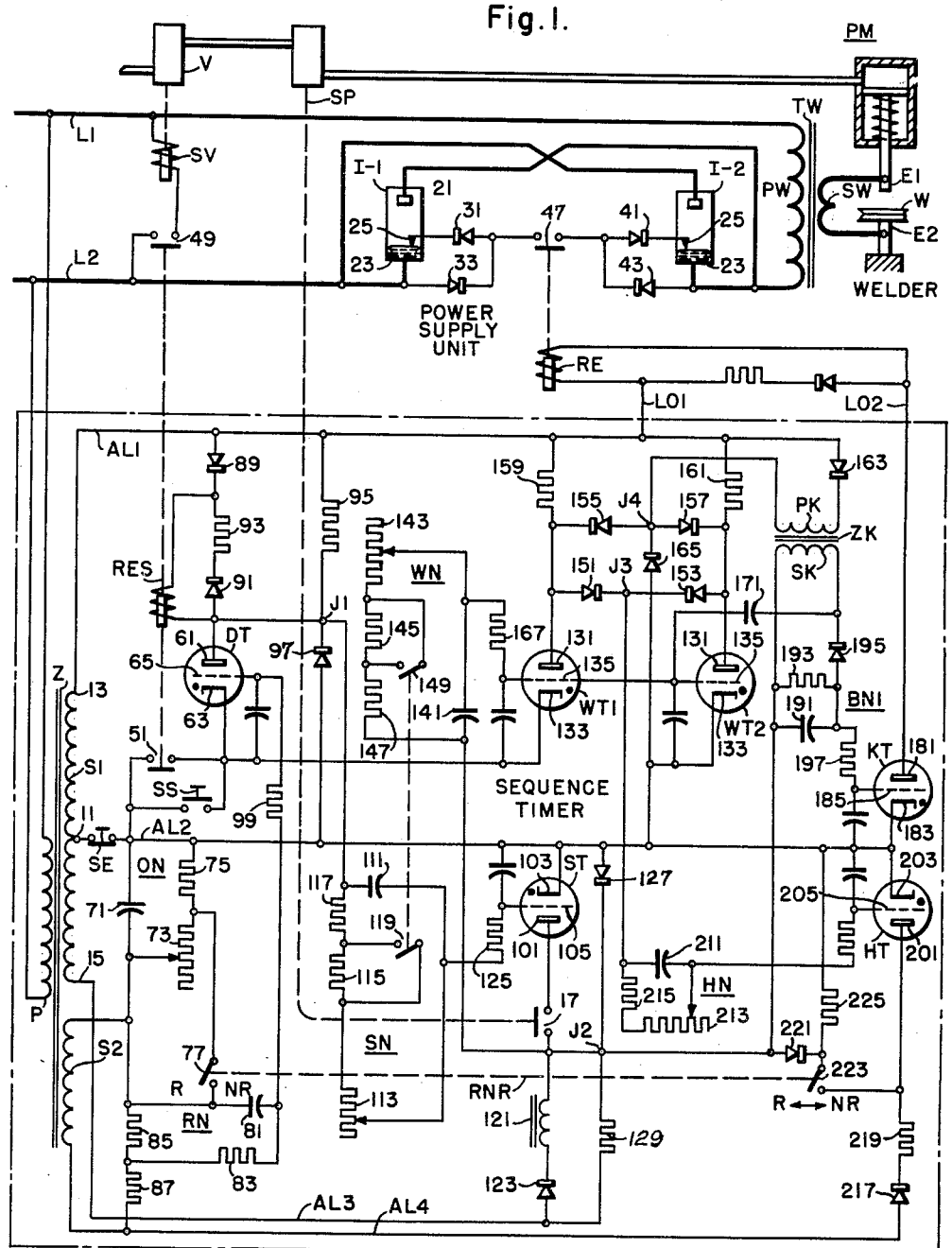
Figure 1 is a circuit diagram of a sequence timer of the so-called NEMA 3B type in accordance with this invention.
Figure 2:
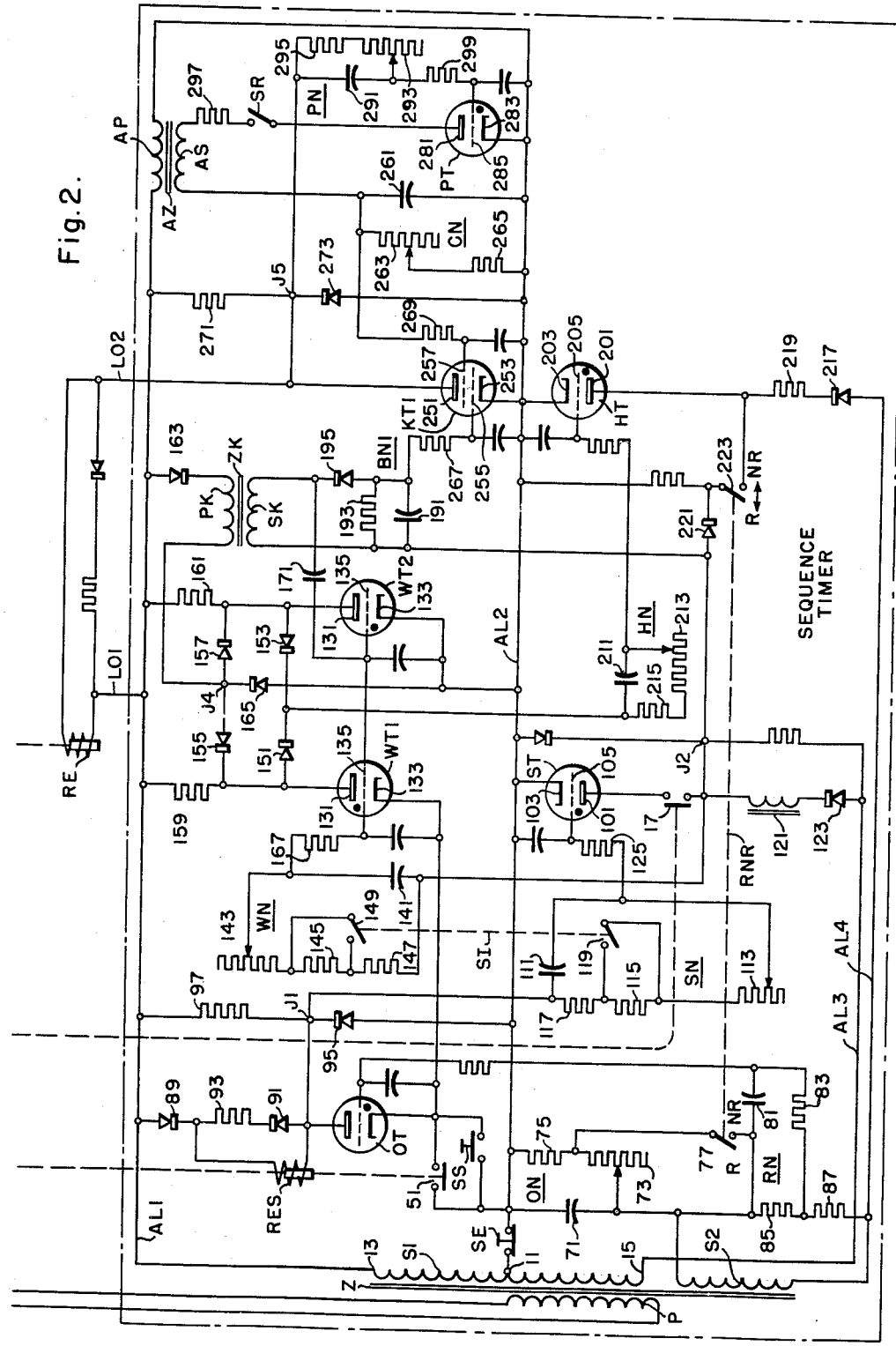
Fig. 2 is a circuit diagram of a sequence timer of the NEMA 5B type in accordance with this invention.
Figure 3:
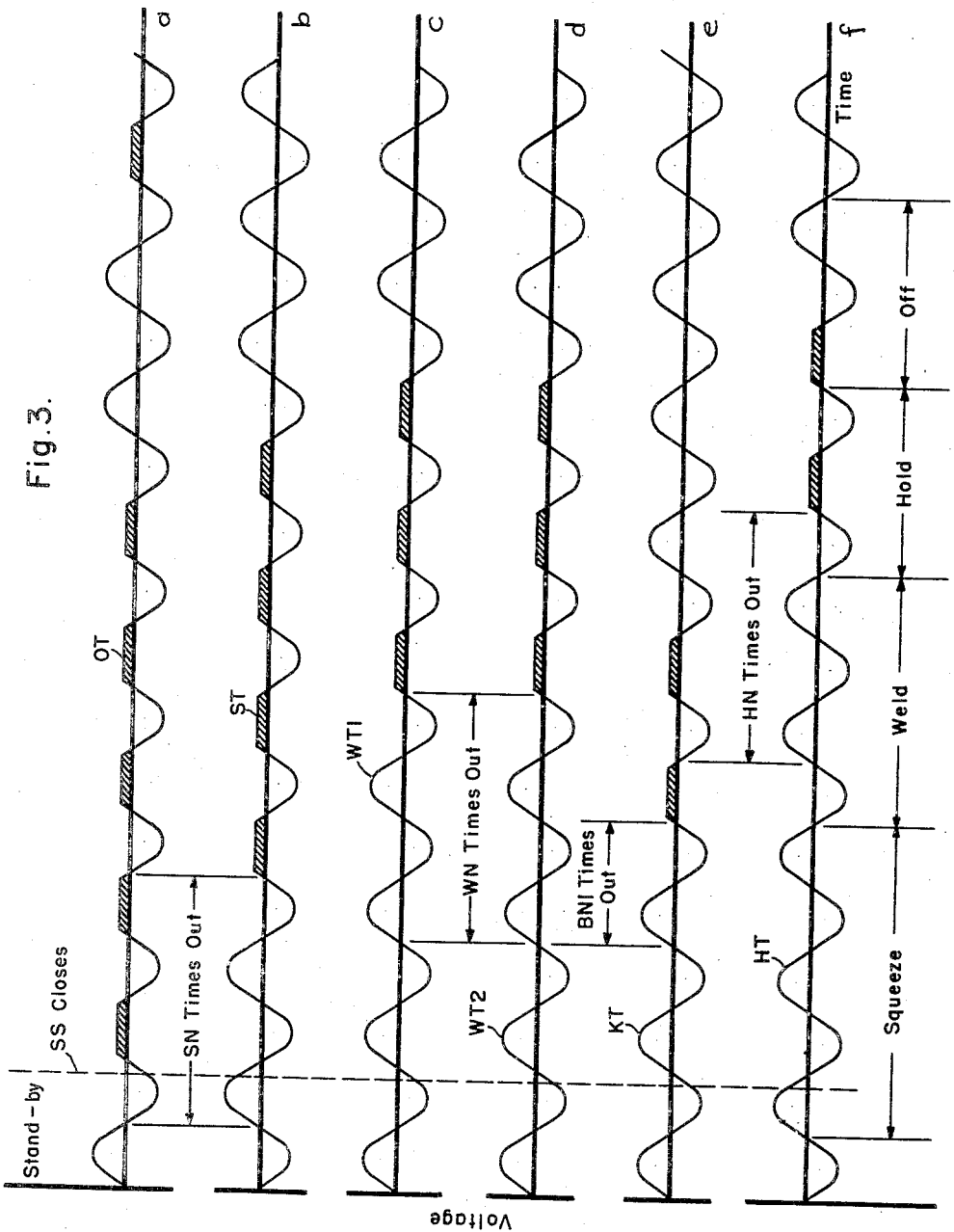
Figure 4:
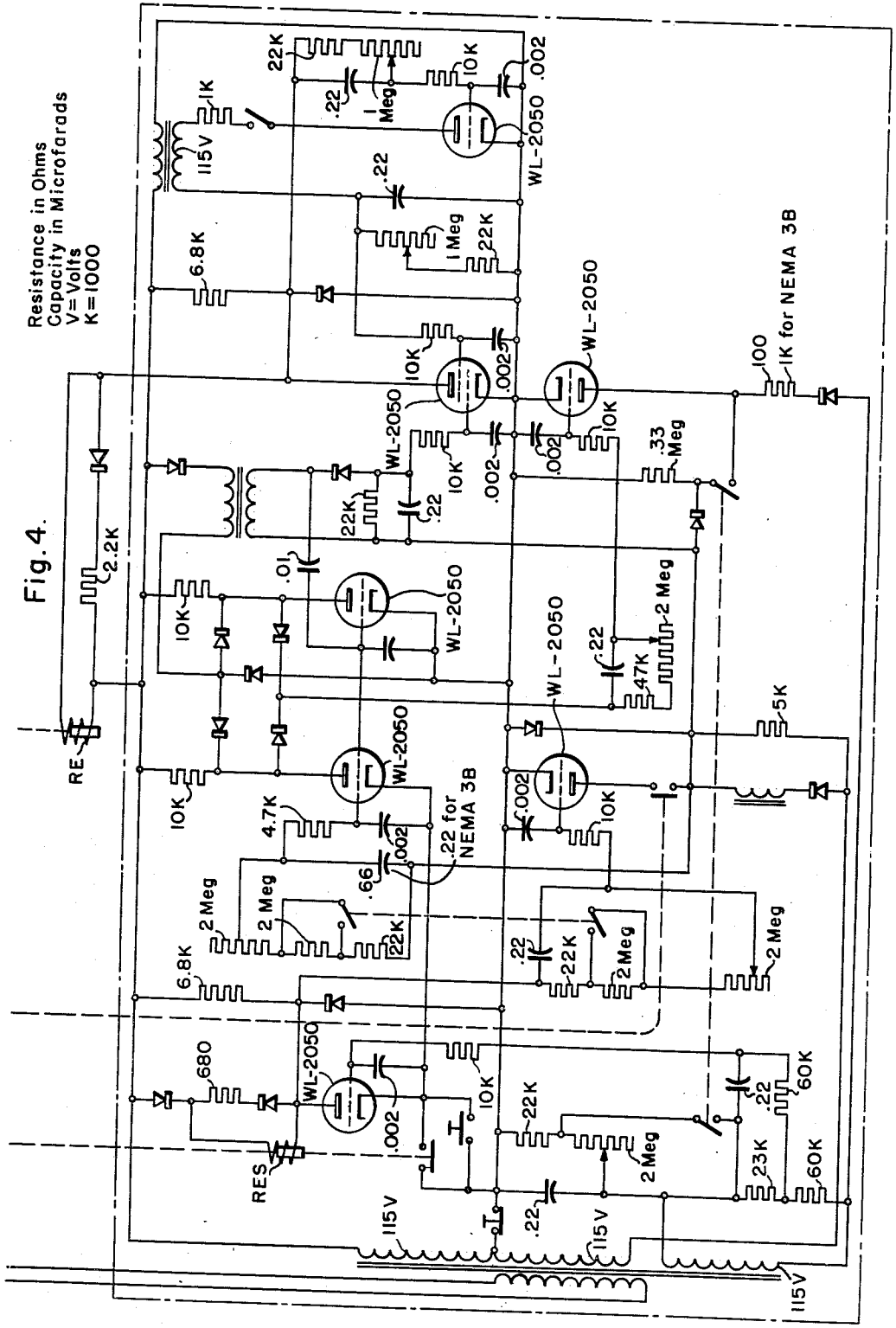

Fig. 3 is a graph illustrating the operation of the apparatus shown in Figs. 1 and 2; and Fig. 4 is a circuit diagram similar to Fig. 2, respectively, but showing the component magnitudes of apparatus which has been constructed, used widely in welding, and found to operate satisfactorily. The portion of Fig. 4 up to the pulsation circuit connected to KT1 presents the component magnitudes for the Fig. 1 apparatus except for two differences shown by notes.

Fig. 4 is presented for the purpose of aiding those skilled in the art in practicing this invention and without any intention of restricting the scope of this invention. It is understood that changes, both in the magnitudes and in the kinds of components identified in Fig. 4, can be made by those skilled in the art without departing from this invention.

*Descripiton—Fig. 1*

The apparatus shown in Fig. 1 includes a Welder, a Power Supply Unit, and a Sequence Timer. This apparatus is supplied from conductors L1 and L2 which may be connected to a commercial supply through the usual circuit breakers or disconnects. The Sequence Timer usually requires a lower voltage than is available across the conductors L1 and L2, and is supplied through conductors AL1, AL2, AL3 and AL4, which are adapted to be energized through a transformer Z having a primary P connected to conductors L1 and L2 and secondaries S1 and S2. The secondary S1 has an intermediate terminal 11 and end terminals 13 and 15.

The Welder includes a welding transformer TW having a primary PW and a secondary SW. Welding electrodes E1 and E2 are connected across the secondary SW. Welding electrode E1 is movable by a pressure mechanism PM into and out of engagement with work W. The supply of fluid for actuating electrode E1 is controlled by a valve V which is actuable by a solenoid SV. A pressure switch SP having contacts 17 in the Sequence Timer is adapted to be closed by the back pressure from the electrode E1 when the pressure on the electrode E1 is adequate.

The Power Supply Unit includes a pair of ignitrons I-1 and I-2, each having an anode 21, a cathode 23 and an igniter 25. The anodes 21 and the cathodes 23 are connected in inverse parallel or anti-parallel in series with the conductors L1 and L2 and the primary PW. Between each igniter and each cathode, a pair of rectifiers 31 and 33 and 41 and 43 is connected so poled as to conduct positive current from the associated cathode 23 to the igniter 25 externally to each of the ignitrons. By "positive current" is meant the flow of ions or holes as distinct from electrons. The junctions of the rectifiers 31, 33 and 41, 43 are adapted to be interconnected by the contacts 47 of a relay RE which controls the flow of welding current.

The Sequence Timer includes an off thyratron OT, a squeeze thyratron ST, weld thyratrons WT1 and WT2, a hold thyratron HT and a control thyratron KT. The Sequence Timer also includes an off network ON, a squeeze network SN, a weld network WN and a hold network HN. In addition, the Sequence Timer includes a ripple network RN and a biasing network BN1. The Sequence Timer further includes a start switch SS, an emergency switch SE and a start relay RES. The conductor AL2 is connected to the intermediate terminal 11 of the secondary S1 through the emergency switch SE, and when the emergency switch SE is opened the supply of power to the conductor AL2 is interrupted. The start relay RES has a pair of contacts 49 and 51, one set 49 connected to close the energizing circuit of solenoid SV and the other lock-in contacts 51.

The off thyratron OT includes an anode 61, a cathode 63 and a control electrode 65. The off network ON includes a capacitor 71 shunted by a variable resistor 73 and a fixed resistor 75. The variable resistor 73 may be shunted out by contacts 77 of the repeat non-repeat switch RNR with the switch set for non-repeat. The ripple network RN includes a capacitor 81 shunted by a pair of resistors 83 and 85, one of which 85 is supplied from the secondary S2 through another resistor 87.

The anode 61 of thyratron OT is connected to the conductor AL1 through a rectifier 89, poled to conduct positive current from the conductor AL1 to the anode, and the coil relay RES. This coil is shunted by another rectifier 91 poled to conduct oppositely to the thyratron OT and a resistor 93. The rectifier 91 and the resistor 93 prevent the relay RES from chattering. The cathode 63 of thyraton OT is adapted to be connected to the conductor AL2 through the normally open lock-in contacts 51 of relay RES or alternatively through the start switch SS. A resistor 95 and a rectifier 97 having a junction J1 are connected between the conductors AL2 and AL1, the rectifier 97 being poled to conduct positive current from conductor AL2 to conductor AL1. The junction J1 is connected to the anode 61 to thyratron OT. The purpose of this resistor and reactor is disclosed in the above-identified applications.

The network ON is connected between the control electrode 65 and conductor AL2 through the ripple network RN and a grid resistor 99. The ripple impressed by the network RN assures that thyratron OT once rendered conducting becomes conducting at the beginning of a half period of the supply.

The squeeze thyratron ST includes an anode 101, a cathode 103 and a control electrode 105. The squeeze network SN includes a capacitor 111 shunted by a variable resistor 113 and a pair of fixed resistors 115 and 117, one of which 115 is adapted to be shunted out by contacts 119 of a switch SI, when the apparatus is set for high speed welding. The anode 101 of thyratron ST is adapted to be connected to conductor AL3 through the contacts 17 of the pressure switch SP, a small inductive reactance 121 and a rectifier 123 poled to conduct positive current from the conductor AL3 to the anode 101. The cathode 103 is directly connected to conductor AL2. The control electrode 105 is connected to junction J1 through the network SN and a grid resistor 125. A rectifier 127 and a resistor 129 having a junction J2 are connected in series between the conductors AL2 and AL3 with the rectifier poled to conduct positive current from AL2 to AL3. The junction J2 is adapted to be connected to the anode 101 of thyratron ST through the contacts 17.

The thyratrons WT1 and WT2 are alike and each has an anode 131, a cathode 133 and a control electrode 135. The network WN includes a capacitor 141 shunted by a variable resistor 143 and a pair of fixed resistors 145 and 147, one of which 145 is adapted to be shunted out by contacts 149 of the switch SI. The anodes 131 of thyratrons WT1 and WT2 are connected to a junction J3 through rectifiers 151 and 153, each poled to conduct positive current from the associated anode 131 to the junction J3. The anodes 131 are also connected to another junction J4 through a pair of rectifiers 155 and 157, each poled to conduct positive current from the junction J4 to the associated anode. Each of the anodes 131 of the thyratrons WT1 and WT2 is also connected to the conductor AL1 through an associated resistor 159 and 161. The cathode 133 of thyratron WT2 is directly connected to conductor AL2; the cathode 133 of thyratron WT1 is adapted to be connected to conductor AL2 through the contacts 51 of relay RES or through switch SS. The junction J4 is connected to the conductor AL1 through a rectifier 163 poled to conduct positive current from the conductor AL1 to the junction J4 and the primary PK of a transformer ZK. The junction J4 is connected, in addition, to the conductor AL2 through a rectifier 165 poled to conduct positive current from the conductor AL2 to the junction J4. It is seen when either thyratron WT1 or WT2 conducts or when both conduct, current flows through the primary PK, through junction J4 and through the conducting thyratron or thyratrons. The flow of current to conductor AL2 directly is prevented by the rectifier 165 connected to junction J4. The network WN is connected between both control electrodes 135 of thyratrons WT1 and WT2 and the junction J2 through a grid resistor 167. In addition, an interlock capacitor 171 is connected between one terminal of the secondary SK and the control electrodes, the circuit being completed through the cathode 133 and the junction J2.

The thyratron KT has an anode 181, a cathode 183 and a control electrode 185. The network BN1 includes a capacitor 191 shunted by a resistor 193 and is connected across the secondary SK of transformer ZK through a rectifier 195. Network BN1 is connected between the junction J2 and the control electrode of thyratron KT through a grid resistor 197. The anode 181 of thyratron KT is connected to conductor AL1 through the exciting coil of relay RE. The cathode 183 is directly connected to conductor AL2. The thyratron KT thus controls the supply of welding current through the relay RE.

This thyratron may also serve to control a heat control unit in the event that the Power Supply Unit is of the type in which the ignitrons I–1 and I–2 are fired by thyratrons. To facilitate the connection either to the relay RE or to a heat control unit, the Sequence Timer is ordinarily provided with output conductors LO1 and LO2.

Thyratron HT has an anode 201, a cathode 203 and a control electrode 205. Network HN includes a capacitor 211 shunted by a variable resistor 213 and a fixed resistor 215. The anode 201 of thyratron HT is connected to one terminal of the secondary S2 through a rectifier 217 poled to conduct positive current from the terminal to the anode and a resistor 219. The anode 201 is also adapted to be connected to the junction J2 through a rectifier 221 and the contacts 223 of the switch RNR when this switch is in the non-repeat position. A resistor 225 is connected between the rectifier 221 and conductor AL2 to stabilize the anode potential on thyratron HT when the apparatus is set for non-repeat.

*Stand-by—Fig. 1*

In the stand-by condition of the apparatus, the conductors L1, L2, and AL1, AL2, AL3 and AL4 are energized. Power is supplied to heat the cathodes of the thyratrons, and the apparatus is ready for operation.

But since switch SS is opened and relay RES is deenergized, thyratrons OT and WT1 are then non-conducting. Relay RES is then deenergized and valve V is closed so that switch 17 is open, and thyratron ST is non-conducting. In addition, electrode E1 is then retracted from the work W. Since the thyratron OT is non-conducting, junction J1 is near the potential of conductor AL1, and network SN is charged by grid conduction through thyratron ST. Thyratron ST is then supplied with a blocking potential. Since thyratron ST is non-conducting, junction J2 is near the potential of conductor AL3, and network WN is charged by grid conduction through the grid circuit of thyratron WT2. A blocking potential is thus impressed on thyratrons WT1 and WT2 by network WN. Thyratron WT2 is then non-conducting.

Since thyratrons WT1 and WT2 are non-conducting, junction J3 is at the potential of conductor AL1, and network HN is charged by grid conductor through thyratron HT. Thyratron HT is then non-conducting. Since thyratron HT is non-conducting, network ON is uncharged and thyratron OT is prevented from conducting only because its cathode is disconnected from conductor AL2. In addition, there is no current flow through primary PK, and network BN1 is not charged from secondary SK. But since thyratron ST is non-conducting and junction J2 is near the potential AL3, network BN1 is charged by grid conduction through thyratron KT, and thyratron KT is non-conducting. Since thyratron KT is non-conducting, relay RE is deenergized and ignitrons I–1 and I–2 are non-conducting.

*Operation—Fig. 1*

It is assumed that work W is to be welded, which requires a succession of spot welds. The switch RNR is then set to the repeat position, and the work W is placed on electrode E2.

To start the welding operation, the switch SS is closed. Thyratron OT is now rendered conducting energizing relay RES. At its lock-in contacts 51, relay RES locks in thyratrons OT so that it remains conducting regardless of the condition of switch SS. At its other contacts 49, relay RES closes an energizing circuit for solenoid SV, and the valve V is opened so that fluid is supplied to actuate electrode E1 which engages the work W. The back pressure actuates switch SP so that its contacts 17 close the anode circuit for thyratron ST. But the latter initially remains non-conducting because it is blocked by network SN. The anode circuit for thyratron WT1 is also closed, but this thyratron together with thyratron WT2 is maintained non-conducting by network WN.

The conduction of thyratron OT reduces the potential at junction J1 permitting network SN to time out. At the end of the squeeze interval, thyratron ST conducts, reducing the potential at junction J2 and permitting network BN1 to discharge. The network BN1 discharges in an interval of the order of a period of the supply. While thyratron ST is non-conducting, charging potential appears at J2 only during alternate half periods. During the intervening half periods whatever charge is impressed on network BN1 in part decays. Thus, prior to the first half period during which thyratron ST conducts, network BN1 will have discharged for a half period, and when thyratron ST conducts, BN1 will then discharge for a second half period. Thyratron KT will then be conditioned to conduct at the end of the half period during which thyratron ST has conducted, and at this time its anode-cathode potential is positive so that it does conduct.

The conduction of thyratron KT energizes relay RE and closes the starting circuit through the igniters of ignitrons I–1 and I–2. Welding current is then supplied to the work W through the transformer TW, and this current continues to flow so long as thyratron KT remains conducting. The relay RE closes its contacts about three-quarters of a period after current starts to flow through the thyratron KT.

The reduction of the potential at J2 also permits the network WN to discharge. When network WN has timed out, thyratrons WT1 and WT2 are able to conduct. Assume that thyratron WT1 conducts first. Current then flows through primary PK, rectifier 163, junction J4, the rectifier 155 in series with thyratron WT1 and thyratron WT2. The potential induced in secondary SK impresses an impulse through the capacitor on the control electrode 135 on thyratron WT2. If thyratron WT2 is in sound condition, it now also conducts. If thyratron WT2 is not in sound condition, only thyratron WT1 continues to conduct.

In either event, network BN1 is charged from secondary SK through the rectifier 195 in series with the secondary to a potential such that thyratron KT becomes non-conducting. Relay RE is then deenergized, and the flow of welding current is stopped. It is seen that the flow of welding current is positively stopped regardless of whether one or both of the thyratrons WT1 and WT2 conduct.

If only thyratron WT1 conducts, junction J3 remains at the potential of conductor AL1 through the rectifier 153 associated with thyratron WT2. The discharge of network HN is then prevented, preventing thyratron HT from becoming conducting, and thus preventing the continuation of the sequence. The Sequence Timer must then be serviced before any further use can be made of it.

But if both thyratrons WT1 and WT2 conduct, the potential of junction J3 is reduced substantially to the potential of conductor AL2, and network HN is permitted to discharge. When network HN times out, thyratron HT becomes conducting, charging network ON. Thyratron OT then becomes non-conducting and relay RES is deenergized. Valve V is then closed, and the electrode E1 is retracted from the work so that the work may be moved to a new position. In addition contacts 17 are opened and thyratron ST is rendered non-conducting.

When thyratron OT becomes non-conducting, the potential of J1 is raised to that of conductor AL1, and network SN is charged providing a blocking potential on thyratron ST. Junction J2 is then raised approximately to the potential of conductor AL3, and network BN1 is adapted to be charged from junction J2; but this network being already charged, this has no effect. The raising of junction J2 to the potential of conductor AL3, in addition, has the effect of charging network WN. When network WN is charged, thyratrons WT1 and WT2 are rendered non-conducting, deenergizing transformer ZK and also permitting network HN to charge. Thyratron HT is now rendered non-conducting, and the system is reverted to its initial condition, except that network ON is charged.

If the switch SS now remains closed, network ON discharged during the off interval, and after it times out, thyratron OT becomes conducting initiating another sequence. Sequences of this type may be repeated so long as switch SS remains closed until the work W is welded.

With the switch RNR in the non-repeat position, the above-described first sequence is repeated to the point at which the thyratron HT conducts. The conduction of thyratron HT, in addition to charging network ON, reduces the potential at junction J2 independently of thyratron ST, so that the discharge of network WN, after the valve V closes, is prevented so long as switch SS remains closed. Thus, in the non-repeat position of the switch RNR, only one weld can be made. To make another weld, the switch SS must be opened disconnecting the charging circuit for network WN and permitting this network to discharge. The discharge of the network resets the Sequence Timer so that another operation may be carried out.

In the event that an emergency occurs requiring that the sequence timer be deenergized, the switch SE is opened. The opening of this switch disconnects the cathodes 63, 133, 183, 103, 203 of the thyratrons OT, ST, WT1, WT2, KT and HT from the supply S1, and these thyratrons are positively rendered non-conducting.

The operation of the apparatus shown in Fig. 1 is illustrated graphically in Fig. 3. In graphs a, b, c, d, e and f, the anode potentials on thyratrons OT, ST, WT2, KT and HT are plotted as a function of time. The shaded regions represent the intervals during which the various thyratrons conduct, assuming that the start switch SS is closed just before the instant T_0. It is seen that the thyratron KT conducts during the half period immediately following the conduction of thyratron ST and is rendered non-conducting during the half period immediately following the conduction of thyratrons WT1 and WT2.

*Description—Fig. 2*

The apparatus shown in Fig. 2 is similar to the apparatus shown in Fig. 1, except that in the apparatus shown in Fig. 3, provisions are included for producing interrupted spot welds. These provisions are embodied in the thyratron KT1, thyratron PT, the cool network CN and the heat network PN. The thyratron KT1 has an anode 251, a cathode 253, a first control electrode 255, and a second control electrode 257. The network CN includes a capacitor 261 shunted by a variable resistor 263 and a fixed resistor 265. The anode 251 is connected to conductor AL1 through the coil of relay RE. The cathode 253 is connected to conductor AL2. The control electrode 255 is connected to junction J2 through a grid resistor 267 and network BN1. The control electrode 257 is connected to conductor AL2 through a grid resistor 269 and network CN. A resistor 271 and rectifier 273 having a junction J5 are connected between conductors AL1 and AL2 with the rectifier 273 poled to conduct positive current from the AL2 to AL1. The junction J2 is connected to the anode 251.

The thyratron PT has an anode 281, a cathode 283 and a control electrode 285. The network PN includes a capacitor 291 shunted by a variable resistor 293 and a fixed resistor 295. The thyratron PT is supplied from an auxiliary transformer AZ having a primary AP and a secondary AS. The secondary AS is connected between the anode 281 and the cathode 283 of thyratron PT through a switch SR which may be closed when the repeat or interrupting spot welding is to be produced, an anode resistor 297 and network CN. The control electrode 285 is connected to junction J5 through the network PN and a grid resistor 299.

*Stand-by—Fig. 2*

In the stand-by condition of the Sequence Timer shown in Fig. 2, thyratrons OT, ST, WT1, WT2, KT1 and HT are non-conducting in the same manner as the corresponding thyratrons of the Sequence Timer shown in Fig. 1. Since thyratron KT1 is non-conducting, junction J5 is approximately at the potential of conductor AL1, and network PN is charged so that thyratron PT is non-conducting and network CN is uncharged. The potential of the second control electrode 257 of thyratron KT1 is then such as to permit this thyratron to conduct, if network BN1 discharges.

*Operation*

In explaining the operation, it is only necessary to consider the portion of the system including KT1, CN, PT and PN. It may be assumed then, that a sequence has been started, and network BN1 has discharged permitting thyratron KT1 to conduct. The conduction of thyratron KT1 energizes relay RE causing welding current to flow. The conduction of thyratron KT1 also reduces the potential at junction J5 permitting network PN to discharge. When network PN has timed out, thyratron PT becomes conducting charging network CN. Thyratron KT1 is then rendered non-conducting deenergizing relay RE and stopping the flow of welding current.

When thyratron KT1 becomes non-conducting, the potential of J5 is raised approximately to that of conductor AL1, and network PN is charged. Thyratron PT then becomes non-conducting permitting network CN to discharge. When network CN has timed out, thyratron KT1 again becomes conducting energizing relay RE and causing welding current to flow. Network PN is now again permitted to discharge to render thyratron PT conducting, and the above described cycle is repeated. This operation continues until network WN times out rendering KT1 non-conducting by the charging of network BN1 and stopping the welding. The sequence then continues in the same manner as the sequence shown in Fig. 1 until the apparatus is reset for another operation.

*Conclusion*

It is seen that a novel Sequence Timer has been disclosed. In the operation of this Sequence Timer, irregularities in the timing of the squeeze and weld timing means are eliminated because the thyratron KT or KT1, which controls the welding current, is connected to be supplied with potential in opposite phase to the potential which supplies the squeeze and hold thyratrons ST and HT. In addition, the proper firing of the thyratrons WT1 and WT2 is assured by an interlock connection through the grid circuits of these thyratrons. Further, a reliable and positively operating emergency switch SE is provided.

While preferred embodiments of this invention have been disclosed herein, many modifications thereof are feasible. The invention therefore is not to be restricted except insofar as is necessitated by the spirit of the prior art.

I claim as my invention:

1. In combination, a first supply conductor, a second supply conductor, a first electric discharge path, a second electric discharge path, each path having an anode, a cathode and a control electrode, potential deriving means, a first rectifier, a second rectifier, means connecting in a first series circuit said first conductor, said second conductor, said potential deriving means, said first rectifier, and said anode and cathode of said first path, said first rectifier and said last-named anode and cathode being poled to conduct in series, means connecting in a second series circuit said first conductor, said second conductor, said potential deriving means, said second rectifier and the anode and cathode of said second path, said second rectifier and said last-named anode and cathode being poled to conduct in series, a control network, means connecting said network to the control electrodes of both said paths so that said network controls the conductivity thereof and means connecting said potential deriving means to said control electrodes of both said paths so that when one of said paths is rendered conducting potential derived from said deriving means is impressed to render the other of said paths conducting.

2. In combination, a first supply conductor, a second supply conductor, a first electric discharge path, a second electric discharge path, each path having an anode, a cathode and a control electrode, a transformer means having primary means and secondary means, a first rectifier, a second rectifier, means connecting in a first series circuit said first conductor, said second conductor, said primary means, said first rectifier and said anode and cathode of said first path, said first rectifier and said last-named anode and cathode being poled to conduct in series, means connecting in a second series circuit said first conductor, said second conductor, said primary means, said second rectifier and the anode and cathode of said second path, second rectifier and said last-named anode and cathode being poled to conduct in series, a control network, means connecting said network to the control electrodes of both said paths so that said network controls the conductivity thereof and capacitor means connecting said secondary means to said control electrodes of both said paths so that when one of said paths is rendered conducting potential derived from said secondary means is impressed to render the other of said paths conducting.

3. A sequence timer including an intermediate terminal and a plurality of additional terminals between each of which the intermediate terminal alternating potential exists, a plurality of electric discharge devices each having an anode and a cathode, means connecting the anode of certain of said devices to each of said additional terminals, means connecting the cathodes of said devices to said intermediate terminal, and means for controlling the conductivity of said devices so that they conduct in succession to initiate, terminate and time the operations of welding apparatus, the said timer being characterized by means for connecting said cathodes to said intermediate terminal which includes switch means adapted to open or close the connection between said cathodes and said intermediate terminal.

4. A sequence timer including first, second and third alternating current supply conductors, said third conductor being at a potential intermediate said first and second conductors, a first electric discharge device having an anode, a cathode and a control electrode, a first time constant network, means including a substantial impedance means for connecting said anode to said second conductor, means connecting said cathode to said third conductor, means connecting in a series circuit said first conductor, said network, said control electrode, said cathode and said third conductor, whereby said network is charged, low impedance means connecting said network to said third conductor on actuation of a starting switch to permit said network to discharge, a second electric discharge device having an anode, a cathode and a control electrode, means when energized causing welding current to flow, means including said energizable means connecting said first conductor to said anode of said second device, means connecting said cathode to said third conductor, a second time constant network, and means connecting said second network between the junction of said impedance means and said anode of said first device and said control electrode of said second device, said second network having a time constant such that when charged and permitted to be discharged it discharges sufficiently in one period of the alternating current to permit said second device to conduct.

5. A sequence timer including first and second alternating current supply conductors and an intermediate supply conductor, the supply potential derivable between said first conductor and said intermediate conductor being in opposite phase to the supply potential derivable between said second conductor and said intermediate conductor, a first electric discharge device having an anode and a cathode, squeeze timing means, means connecting said anode and said cathode between said first conductor and said intermediate conductor with said anode electrically nearest said first conductor, means connecting said anode and cathode in circuit with said squeeze timing means so that on conduction of said first device said squeeze timing means times out, a second electric discharge device having an anode, a cathode and a control electrode, means connecting said last-named anode and cathode between said second conductor and said intermediate conductor with said anode electrically nearest said second conductor, means connecting said squeeze timing means in circuit with said last-named control electrode so that said squeeze timing means when charged prevents the conduction of said second device during the stand-by condition of said timer and until said squeeze timing means times out, a third electric discharge device having an anode, a cathode and a control electrode, means for controlling the flow of welding current, means including said controlling means connecting the anode and cathode of said third device between said first conductor and said intermediate conductor, with said cathode electrically nearest said third conductor, biasing means connected to said control electrode of said third device for maintaining said third device non-conducting in the stand-by condition of said apparatus, means connected to said control electrode of said third device and the anode and cathode of said second device responsive to the conduction of said second device for counteracting said biasing means, weld timing means, means connected between the anode and cathode of said second device and said weld timing means for initiating the timing out of said weld timing means on conduction of said second device, means connecting the control electrode of said third device to said weld timing means to terminate conduction of said third device on timing out of said timing means, a fourth electric discharge device having an anode, a cathode and a control electrode, a hold timing means, means connecting said anode and cathode of said fourth device between said second conductor and said intermediate conductor with said anode electrically nearer said second conductor, means connecting said hold timing means to said control electrode of said fourth device to prevent conduction of said fourth device in the stand-by condition of said timer and until said hold timing means has timed out, and means responsive to the timing out of said weld timing means to initiate the timing out of said hold timing means.

6. A sequence timer including a plurality of end conductors and an intermediate conductor for supplying alternating current, the potential derivable between one of said end conductors and the intermediate conductor being in opposite phase to the potential derivable between the other end conductor and the intermediate conductor, squeeze timing means, weld timing means, hold timing means, means for controlling the flow of welding current, a first, second, third and fourth electric discharge devices each having an anode, a cathode, and a control electrode, means connecting the anodes and cathodes of two of said devices between one of said end conductors and said intermediate conductors, with the anodes electrically nearest said one end conductor, means connecting the anode and cathodes of said other devices between said other end conductor and said intermediate conductor with said anodes electrically nearer said other end conductor, said means connecting said anode and cathode of said third device including said controlling means, means connected to the control electrode of the first device for controlling the conductivity thereof, means connecting the anode and cathode of the first device in circuit with said squeeze timing means to control the setting of said squeeze timing means in accordance with the conduction of said first device, means connecting said squeeze timing means in circuit with the control electrode of said second device to control the conduction of said second device in accordance with the setting of said squeeze timing means, means connecting said anode and cathode of said second device in circuit with said weld timing means to control the setting of said weld timing means, means connecting the anode and cathode of said second device to the control electrode of the third device to control said third device in accordance with the conduction of said second device, means connecting said weld timing means to the control electrode of said third device to control the conduction of said third device in accordance with the setting of said weld timing means, means connecting said weld timing means to said hold timing means to control the setting of said hold timing means in accordance with the setting of said weld timing means, and means connecting said hold timing means to the control electrode of said fourth device to control conduction of said fourth device in accordance with the setting of said hold timing means.

7. A sequence timer including weld timing means, means for initiating the timing out of the weld timing means, welding current control means, means responsive to said initiating means connected to said control means for actuating said control means to cause welding current to flow, hold timing means, a network including a pair of electric discharge path means, means connected to said path means for maintaining both said path means non-conducting while said weld timing means is timing out, means responsive to the timing out of said weld timing means rendering both said path means conducting simultaneously, means responsive to the conduction of either of said path means connected to said control means for actuating said control means to terminate the flow of welding current, and means responsive to the conduction only of both of said path means connected to said hold timing means for initiating the timing out of said hold timing means, the said timer being characterized by interlock means connected between said path means for assuring that when either path means is rendered conducting responsive to the timing out of said weld timing means the other path means is also rendered conducting.

8. In combination, a first thyratron having an anode, a cathode and a control electrode, a second thyratron having an anode, a cathode and a control electrode, a first supply conductor, a second supply conductor, means connecting the anode of the first thyratron to said first conductor, means connecting the anode of the second thyratron to the first conductor, means connecting the cathode of the first thyratron to said second conductor, means connecting the cathode of the second thyratron to said second conductor, and a control circuit common to the control electrodes of both said thyratrons, said control circuit including means connected in common to the control electrodes of both thyratrons tending to render both said thyratrons conducting simultaneously, the said combination being characterized by such a control circuit including means connected to the anode circuits of both thyratrons for supplying a potential to render either of said thyratrons conducting when the other thyratron is rendered conducting to assure that both thyratrons conduct simultaneously.

References Cited in the file of this patent

UNITED STATES PATENTS

| | | |
|---|---|---|
| 1,937,921 | Stansbury | Dec. 5, 1933 |
| 2,574,373 | Bivens | Nov. 6, 1951 |
| 2,611,863 | Bivens | Sept. 23, 1952 |
| 2,625,676 | Konick | Jan. 13, 1953 |